(12) United States Patent
van Hekken

(10) Patent No.: US 6,767,019 B2
(45) Date of Patent: Jul. 27, 2004

(54) ERGONOMIC UTILITY CART

(75) Inventor: Hendrik R. van Hekken, Allentown, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 10/164,462

(22) Filed: Jun. 6, 2002

(65) Prior Publication Data

US 2003/0227150 A1 Dec. 11, 2003

(51) Int. Cl.⁷ .............................................. B62B 3/00
(52) U.S. Cl. ............... 280/47.35; 211/189; 108/147.12
(58) Field of Search .......................... 280/47.34, 47.35, 280/79.11, 79.2; 211/126.1, 189; 108/147.12, 147.15, 92, 96; 312/249.12, 249.13, 249.8; 248/129; 246/129

(56) References Cited

U.S. PATENT DOCUMENTS

| | | | |
|---|---|---|---|
| 3,509,831 A | * 5/1970 | Schnetzer | 108/26 |
| 4,455,010 A | 6/1984 | Butler | |
| 4,526,334 A | 7/1985 | Rantakari | |
| 4,586,750 A | 5/1986 | Vogel | |
| 4,607,577 A | 8/1986 | Leonardo | |
| 4,632,597 A | 12/1986 | Clausen et al. | |
| 4,650,145 A | 3/1987 | Natzel et al. | |
| 4,786,122 A | * 11/1988 | Nichoalds | 312/257.1 |
| 4,936,068 A | * 6/1990 | VictorSchonfeld et al. | 52/282.2 |
| 4,998,023 A | * 3/1991 | Kitts | 280/47.35 |
| 5,011,104 A | 4/1991 | Fang | |
| 5,072,955 A | * 12/1991 | Holland et al. | 280/32.5 |
| 5,337,989 A | 8/1994 | Apple | |
| D357,781 S | 4/1995 | Crinion | |
| 5,529,423 A | * 6/1996 | Burke et al. | 403/218 |
| 5,642,898 A | * 7/1997 | Wise | 280/652 |
| 5,647,650 A | * 7/1997 | Daugherty et al. | 312/265.1 |
| 5,695,205 A | * 12/1997 | Liu | 280/79.2 |
| 5,775,234 A | 7/1998 | Solomon et al. | |
| 5,875,904 A | * 3/1999 | Vorstenbosch | 211/180 |
| 5,890,438 A | 4/1999 | Frankish | |
| 5,894,805 A | 4/1999 | Raasch et al. | |
| D411,678 S | * 6/1999 | Di Paolo | D34/21 |
| 5,971,512 A | * 10/1999 | Swan | 312/281 |
| 6,036,034 A | * 3/2000 | Battaglia et al. | 211/187 |
| 6,102,497 A | * 8/2000 | Ehr et al. | 312/209 |
| 6,135,032 A | * 10/2000 | Ko | 108/96 |
| 6,189,459 B1 | * 2/2001 | DeAngelis | 108/96 |
| 6,223,917 B1 | * 5/2001 | Bruder | 211/189 |
| 6,231,142 B1 | * 5/2001 | Pochet | 312/265.3 |
| 6,247,770 B1 | * 6/2001 | Glass | 312/263 |
| 6,497,233 B1 | * 12/2002 | DeAngelis | 128/849 |

\* cited by examiner

*Primary Examiner*—Brian L. Johnson
*Assistant Examiner*—Christopher Bottorff
(74) *Attorney, Agent, or Firm*—Buchanan Ingersoll, P.C.

(57) ABSTRACT

A versatile and ergonomic utility cart is provided. The utility cart can be constructed to various heights, depending upon the length of support posts secured between a top and bottom shelf. The cart can be any shape or design: triangular; rectangular; octagonal and so forth. A vertically adjustable tray support arm mounts a support tray in close proximity to the utility cart. The tray support arm includes a vertical member which is inserted through the top shelf and into the support post and is frictionally secured thereto by a spring-loaded wedge assembly. An articulated arm is rotatably mounted to the vertical member at one end and rotatably mounted to a support tray at an opposite end. The interior of the utility cart between the top and bottom shelves may be left exposed and accessible or may be enclosed by a plurality of panels and door assembles.

7 Claims, 8 Drawing Sheets

ERGONOMIC UTILITY CART

BACKGROUND OF THE INVENTION

1. Technical Field

The present invention is directed to a utility cart, and more particularly, to an ergonomic utility cart having interchangeable and adjustable tray support assemblies.

2. Background of the Invention

The use of utility carts for supporting various office supplies, such as computer equipment, electronic equipment such as overhead projectors for preparing and presenting presentations, and filing cabinets for file folders and the like are well known in the art. These carts are readily transportable, such as being supported by casters, in order to easily move the carts from location to location and room to room thereby enhancing their versatility. Generally the carts come in various sizes for accommodating these different types of equipment and office supplies. As a general rule these carts are of different overall designs in order to accommodate these various needs.

Another reason why utility carts come in different sizes is to accommodate the different types of computer equipment, either standard central processing unit machines (CPUs) or as a support platform for a laptop computer. The carts can either be used by a person in a standing or seated position according to the desires of the user of the equipment. CPUs themselves can be configured in either a flat condition or a tower condition. Preferably the CPU is hidden such as being on a shelf within an enclosed cabinet and the cart provides for wire management between the keyboard, a pointing device such as a mouse, and the monitor for connecting the particular equipment to the CPU. When configured in a tower arrangement more clearance is required within the cart in order to accommodate the increased height of the CPU. Alternatively a cart having a support platform for a laptop computer is desired, wherein the laptop may be connected to a video presentation device such that the person operating the laptop projects the screen images from the presentation software running on the laptop onto a viewing screen for the personnel to whom the presentation is being giving. Thus sufficient area for supporting a laptop is needed with the cart so that it and the other electronic equipment can be supported by the cart.

When used as a means for hanging file folders for example, wherein the cart is typically a rectangular four sided apparatus, one or more sides of the cart are left open for access to the files or equipment stored on a lower shelf thereof. In an alternative arrangement a hinged door is provided on one or more sides of the utility cart for gaining access to the interior.

In those situations where a separate platform is associated with the utility cart, such as for supporting a keyboard or a laptop computer, it is desired that the platform be adjustable both in height and with respect to the orientation it has with the cart. The height accommodates different users of the computer equipment in order to provide an ergonomic work platform for the user in either a seated or standing position. Also it is desired that the platform be positionable with respect to the cart in order to accommodate any type of arrangement that a user may desire.

It is desirable therefore to provide a utility cart having relatively standardized components which can be configured for various uses, for example a storage cart, computer work station, presentation cart, or a file folder cart, etc.

It is therefore an object of the present invention to provide a utility cart that is readily reconfigurable by a user according to its intended use.

It is a further object of the present invention to provide an ergonomic utility cart which can be constructed of standardized components and is readily adjustable according to the needs of the user.

It is a still further object of the present invention to provide a utility cart which can be provided with any type of exterior finished design.

It is a still yet further object of the present invention to provide a utility cart having a means of attaching a support tray thereto, which tray can be positioned about the utility cart in a variety of ways.

SUMMARY OF THE INVENTION

In accordance with the above, a cart assembly comprises a bottom shelf and a top shelf having a plurality of support posts secured therebetween. A tray support assembly comprises at least one support arm having a first portion adapted to be frictionally engaged with an interior surface of at least one of the support posts. An articulated arm has a first end connected to a second portion of the support arm opposite the first portion and a support tray connected to a second end of the articulated arm opposite the first end. The support tray is rotatable with respect to the utility cart, whereas the support arm is vertically adjustable within the support post.

BRIEF DESCRIPTION OF THE DRAWINGS

Various other objects, features and advantages of the invention will be readily apparent according to the following description exemplified by the drawings, which are shown by way of example only, wherein.

DESCRIPTION OF THE PREFERRED EMBODIMENTS

Figure 1A:
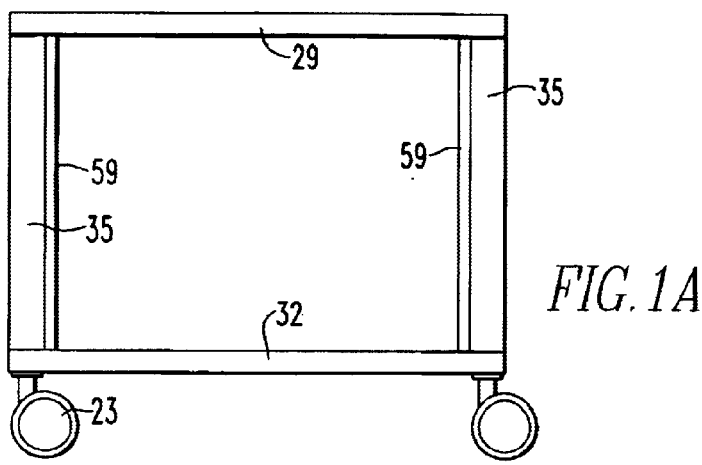
FIG. 1, consisting of FIGS. 1A, 1B and 1C, are schematic representations of three different heights for various embodiments of the utility cart of the present invention.
Figure 1B:
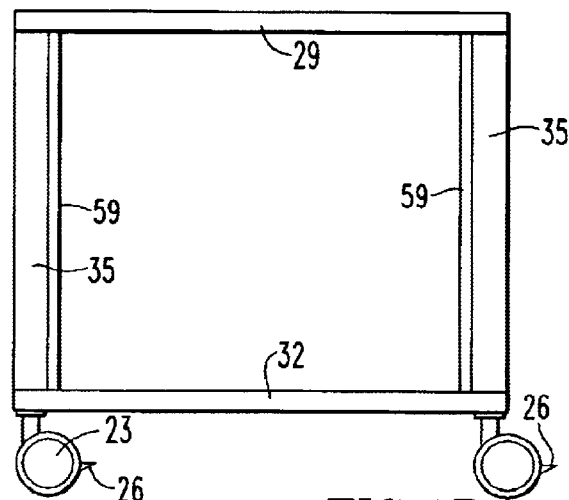
Figure 1C:
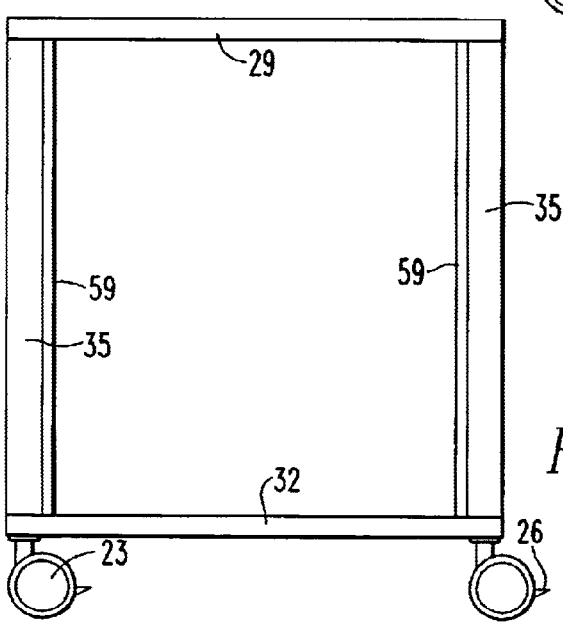

Referring now to the drawings in detail, the various embodiments of the present invention will be described, in conjunction with the Figures, wherein like numerals refer to similar components throughout. As shown in FIG. 1 the utility cart 20 of the present invention is shown as including three different designs: FIG. 1A showing a low cart 20a, FIG. 1B showing a medium cart 20b, and FIG. 1C showing a large cart 20c. In order to describe the utility cart 20 in particular detail and not to limit any of its various uses, the present invention will be generally described so that the low cart 20a is used for supporting a standard personal computer, the medium cart 20b is used to support a laptop computer for a video presentation and the larger cart 20c is used as supporting file folders or binders. Although three separate sizes of the utility cart 20 are shown in drawings, it will be readily appreciated by those skilled in the art that higher or lower carts may also be used, such as useable for a bookshelf, and/or wider carts maybe used. Also, the uses for the cart are interchangeable. For example the rectangular dimension of the carts shown in FIG. 1 could be replaced by either a square design or an oval shaped design. In each of the embodiments shown in FIG. 1 the utility cart 20 is supported on the floor by casters 23, which enable the cart to be rolled from room to room more easily. Preferably the casters include a lock 26 such that when the cart 20 has been moved to the desired location the casters 23 are locked and thus the cart 20 is prevented from rolling.

Figure 2:
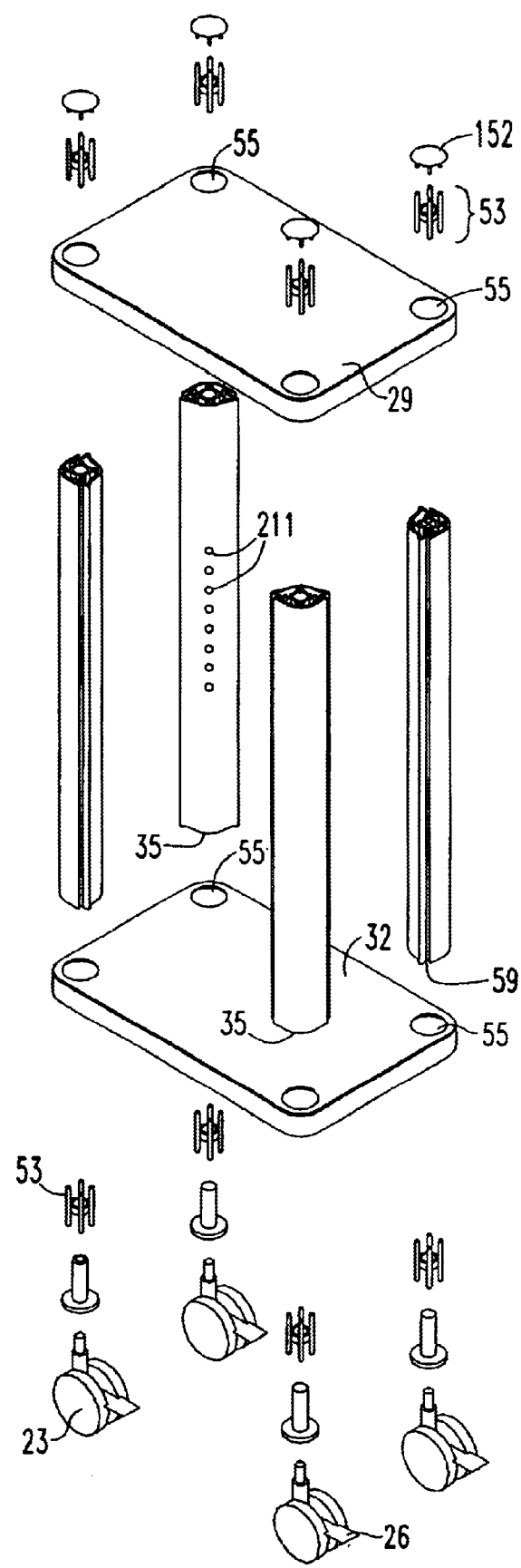
FIG. 2 is an exploded view of the utility cart shown in FIG. 1C.
Figure 3A:
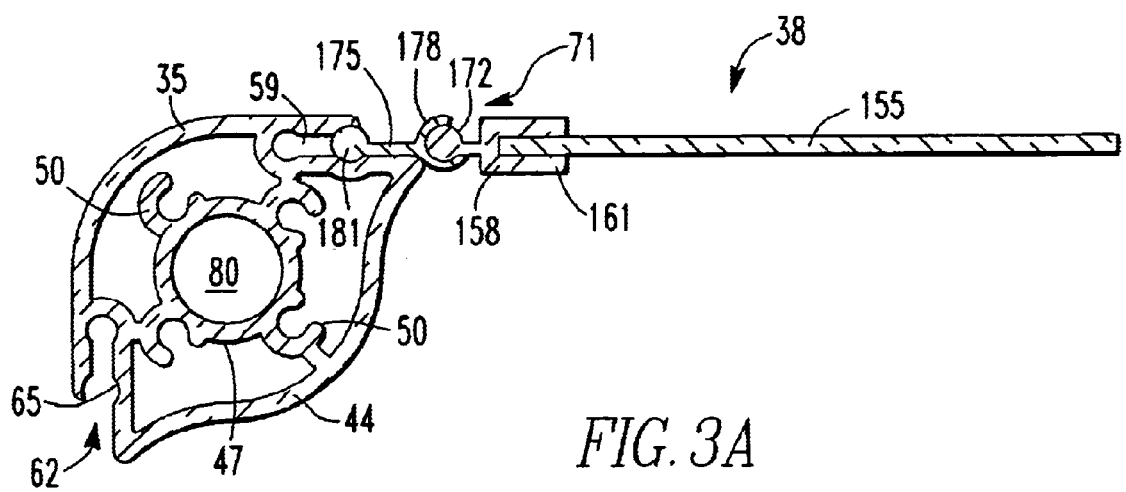
FIG. 3, consisting of FIGS. 3A and 3B, are cross-sectional views of a corner support post according to the present invention, showing a cart having a door (FIG. 3A) and a solid panel cover (FIG. 3B), respectively.
Figure 3B:
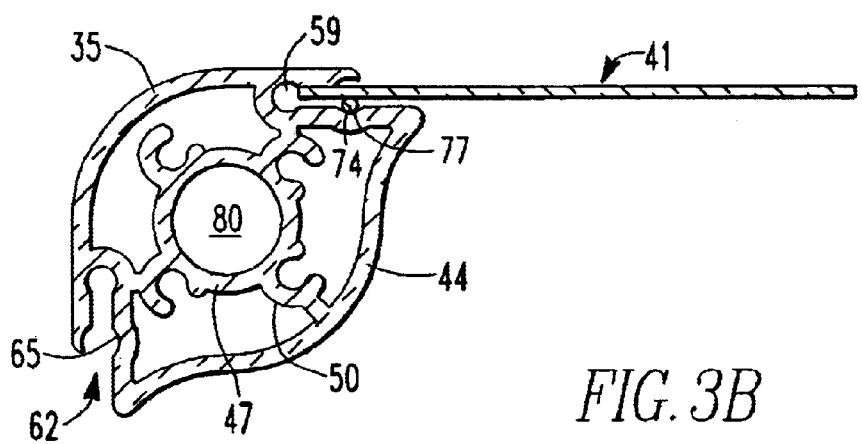

As shown in the exploded view of FIG. 2, the utility cart 20 comprises a top shelf 29 and a bottom shelf 32 having a plurality of support posts 35 secured therebetween. Although four (4) support posts 35 are shown, it would be readily apparent to those skilled in the art that three posts may be used to provide a triangular shaped cart, for example, or more posts may be used, such as three posts may be provided along the long axis of a rectangular shaped cart in order to provide more support for the top shelf. In addition it may be possible to provide a bottom shelf 32 and a top shelf 29 on a relatively elongated support post which support post would also support an intermediate shelf (not shown). As shown in FIGS. 3A and 3B the support post 35 of the present invention comprises a relatively hollow extruded member. Preferably the support posts are extruded from aluminum which provides strength in a relatively lightweight member.

As illustrated in FIG. 3, FIG. 3A shows a support post 35 having a door 38 attached thereto, while FIG. 3B shows a support post 35 having a one piece panel cover 41 disposed therein, as will be more fully described hereinafter. The support post 35 comprises an outer hollow member 44 and an inner hollow member 47 secured therein. The inner hollow member 47 is operatively associated with the outer hollow member 44 by a plurality of, preferably four (4), generally 'C' shaped members 50 which are adapted to receive screws 53, as shown in the exploded view in FIG. 2. The screws 53 pair through corresponding openings 55 in each of the top 29 and bottom 32 shelf in order to secure them to the support post 35. In this manner the top and bottom shelf are substantially identical. Thus the difference between the various heights of the utility carts 20A, 20B and 20C is provided by different substantial height support posts 35. As the top 29 and bottom 32 shelf are identical for each embodiment and when compared with each other, this greatly simplifies the manufacturing of the present invention. The inner hollow member 47 of the support post 35 is adapted to receive an adjustable tray support arm 56 (which will be more fully described hereinafter in conjunction with FIGS. 4–7). The outer hollow member 44 of the support post 35, in the embodiment shown, includes a pair of slots 59 for receiving either a hinged door 38 or a straight panel 41, FIGS. 3A and 3B respectively. Preferably two slots 59 are provided and oriented with respect to each other such that when the support posts 35 are provided at each corner of the cart, as shown in FIG. 1, the slot at one corner is aligned with another slot 59 in the outer hollow member 44 of another support post 35 in an adjacent corner as will be more fully described hereinafter. While the slots are shown as being oriented at about 90° with respect to each other, it will be appreciated by those skilled in the art that the slots may have a different orientation such as for a three sided cart (120°), five sided cart (112°), six sided cart (60°) or more sided utility cart.

As shown in FIG. 3A the slot 59, at an opening portion 62 thereof, includes a relatively first circular portion 65. As shown in FIG. 3A the circular portion 65 at the opening of the slot 59 is adapted to receive a circular member for securing either a straight panel 41 between support posts 35 or a hinged door 38. For the hinged door 38 a hinge assembly 71 is constructed so as to be rotated therein. This will be more fully described hereinafter. As shown in FIG. 3B, when a one piece panel 41 cover is disposed between two support posts 35, the panel is held secured to the support post such as by a rubber extrusion 74 which fits between the panel cover 41 and one side 77 of the first portion 65 at the opening of the slot 59.

Figure 4:
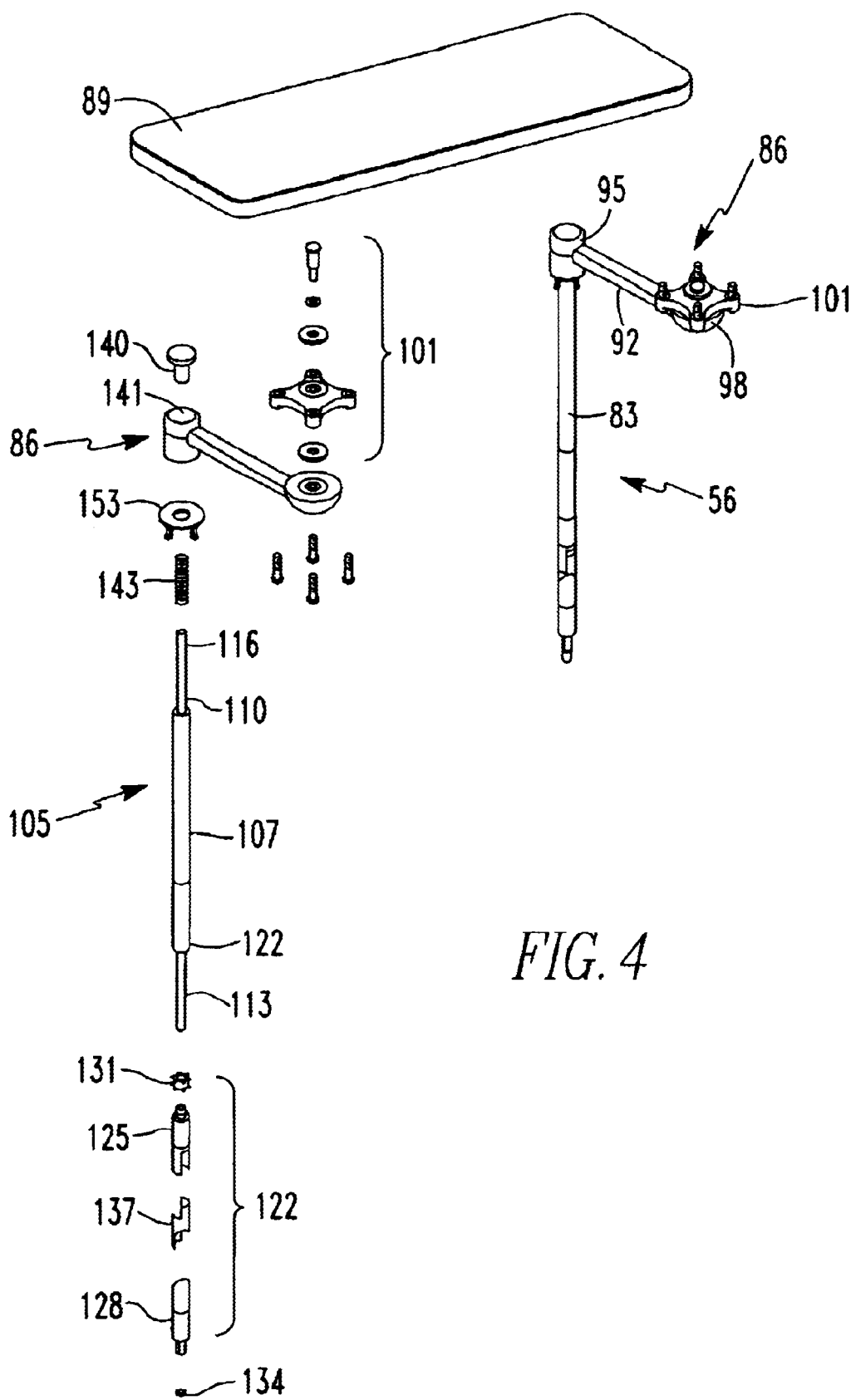
FIG. 4 is an exploded view of a tray support arm according to the first embodiment of the present invention.
Figure 5:
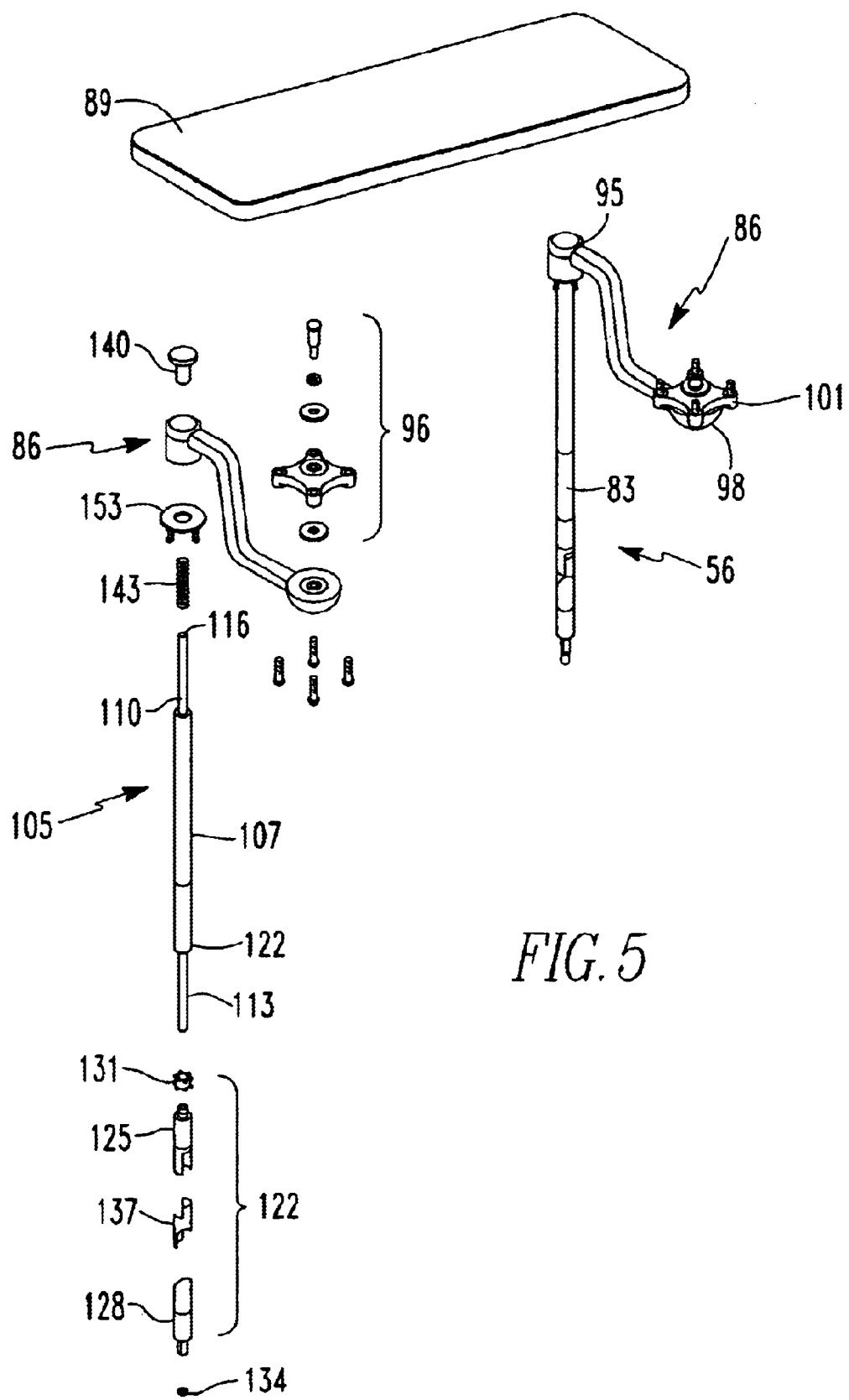
FIG. 5 is an exploded view of a tray support arm according to a second embodiment of the present invention.
Figure 6:
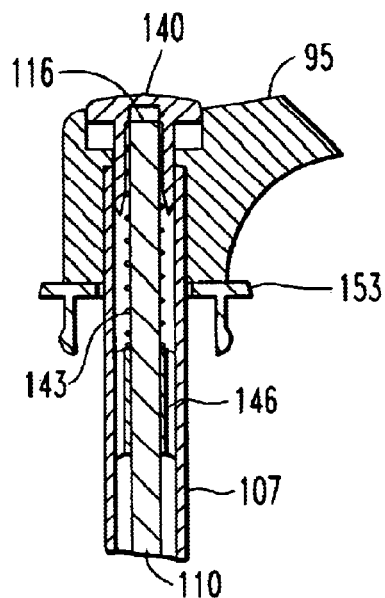
FIG. 6 is a detailed view of an upper portion of a vertical member of the tray support arm.

As shown in FIGS. 4–7 the utility cart 20 includes at least one and preferably two vertically adjustable support arms 56 which are adapted to fit within an interior portion 80 of the inner hollow member 47 of the support post 35. Two embodiments of the support arms 56 are shown in FIGS. 4 and 5 and each support arm 56 generally includes a vertical member 83, which is substantially identical between the two embodiments shown, and an articulated arm 86 for supporting a tray 89. In the embodiment shown in FIG. 4, the articulated support arm 86 has a relatively straight horizontal section 92 between the first angular section 95 at a first end rotatably connected 96 to the vertical member 83, and a second angular section 98 at the second end opposite the first end connected to the vertical member 83, which second angular section 98 is also preferably rotatably connected 101 to the underside of a support tray 89. In the embodiment shown in FIG. 5, however the section between the first 95 and second 98 angular sections comprises a third angular section 104 such that the support tray 89 is generally disposed below the level of the articulated arm 86 connection to the vertical member 83. The reasons for this will be more fully set forth hereinafter.

As shown in the exploded view of FIGS. 4 and 5, the vertical member 83 in each embodiment includes a vertical adjustment mechanism 105 for the tray support arm 56 which generally comprises an outer tube 107 having a rod 110 freely movable within the outer tube 107. The opposed ends 113 (lower in the Figures) and 116 (upper in the Figures) of the rod 110 extend beyond the respective ends of the outer tube. On the lower end of the vertical adjustment mechanism 105 is a wedge assembly 122 for frictionally securing the vertical member 83 of the tray support arm 56 within the interior portion 80 of the inner hollow member 47 of the support post 35. Attached to the outer tube 107 at the engagement or first portion 119 of the vertical member 83 is a first wedge 125, and a second wedge 128 secured to the engagement end 113 of the rod 110 which extends beyond the outer tube 107. The second or lower wedge 128 is threaded and secured to the engagement end 113 of rod such as by a nut 134. The rod 110 slides within a first tube nut 131 secured within the outer tube 107. Disposed between the first 125 and second 128 wedge is an angular washer 137 which is slidably associated with the engagement end 113 of the rod 110. The rod is free to slide within a hollow portion of the first wedge 125 and within the washer 137. The opposite (upper) end 116 of the rod projecting above the outer tube 107 is operatively associated with button 140, which button also passes through an opening 141 in the first angular section 95 of the articulated arm 86. The button 140 is operably associated with the outer tube 107 by a spring 143, and is secured to the rod 110 such as by a second tube nut 146, which second tube nut also frictionally engages the inside of the outer tube 107. The spring 143 therefore biases the button 140 in an upward direction (as shown in the Figures).

Figure 7A:
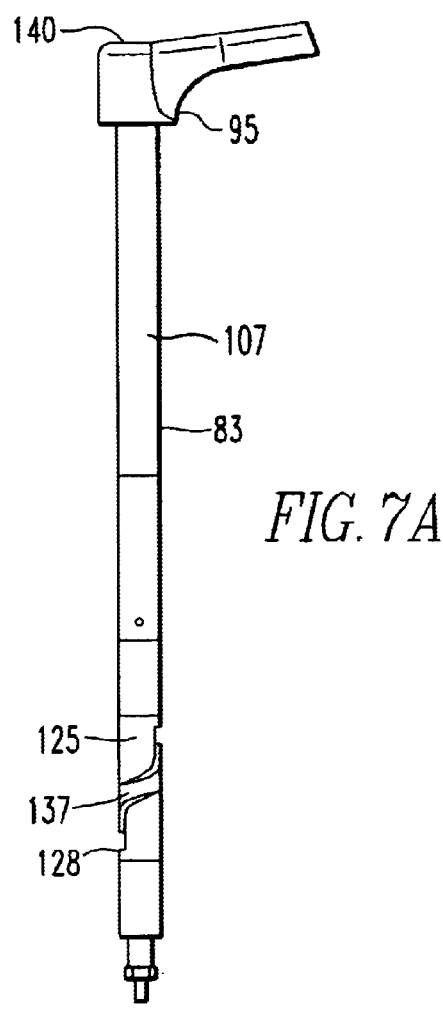
FIG. 7, consisting of FIGS. 7A and 7B, are views of a vertical adjustment mechanism of the tray support arms shown in FIGS. 4 and 5 in the released and engaged position, respectively.
Figure 7B:
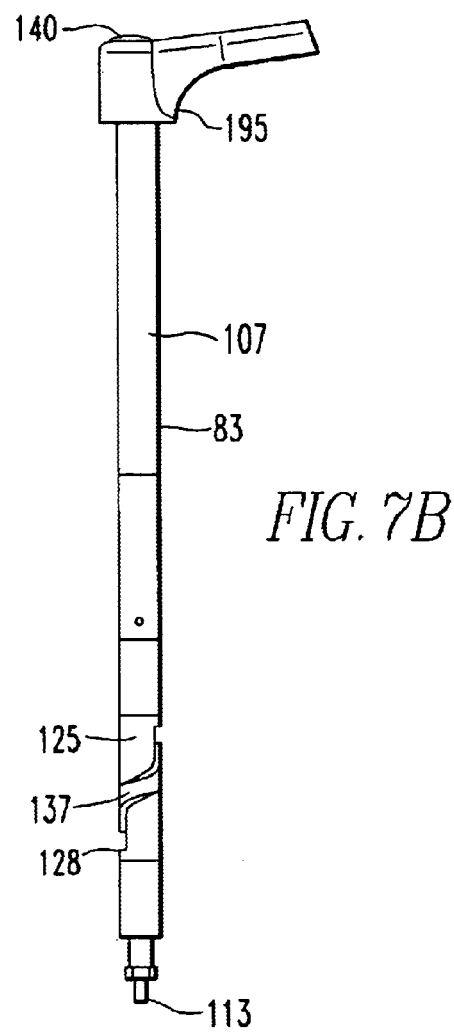

The opposite end 116 of the rod 110 may be attached to the button 140 such as by a set screw (not shown). Referring now to FIGS. 7A and 7B, when the user presses down on the button 140, it causes the rod 110 to slide within the outer tube 107 thereby urging the lower or second wedge 128 away from the upper first wedge 125, thereby allowing the washer 137 to slide freely downward with the lower wedge (See 7A). As shown in FIG. 7B in the engaged position, when an operator releases the pressure on the button 140 the spring 143 causes the button and rod 110 to move upward with respect to the outer tube 107, thereby causing the lower wedge 128 to contact the angled washer 137 and forces the second wedge 128 into engagement with the washer 137, and the washer 137 into engagement with the first wedge 125. Preferably the wedge members 125, 128 are comprised of relatively soft material such as santoprene/TPE whereas the washer 137 is comprised of a relatively hard material such as nylon.

When the second wedge 128 is forced into contact with the washer 137 which is then forced into contact with the first wedge 125, the washer 137 forces the angled contacting portions of the respective wedge assemblies in a direction generally perpendicular to the vertical adjustment mechanism 105. In this position the soft material of the wedges 125, 128 is frictionally engaged with the interior surface 80 of the inner hollow member 47 of the support post 35. This frictional engagement is sufficient to secure the tray support arm 56 with respect to the utility cart 20, regardless of whether a keyboard, pointing device or laptop computer is resting on the support tray 89. In order to adjust the height of the tray support arm 56 with respect to the utility cart 20, or to remove the tray support arm 56 from the cart altogether, the operator need to merely grasp both articulated arms 86, pressing down on both buttons 140 to release the engagement of the wedge assemblies 122, that is, of the first 125 and second 128 wedges with the washer 137, thereby releasing the frictional engagement of the wedge assemblies 122 with the interior surface 80 of the inner hollow member 47. The support arms can them be readily lifted upward and removed from the support posts 35.

In order to use the utility cart 20 without either of the support trays, as shown in FIG. 2, cap assemblies 152 can be used to cover each opening 55 provided in the top tray 29 through which the screws 53 are used to secure the top tray to the support posts 35. By way of example in the drawing shown in FIG. 2, four caps are used, one for each support post. In order to attach the tray support arms 56 to the cart 26, at least one of these caps 152 is removed. It may be desirable to use a single support arm having a relatively smaller tray having a single vertical member 83 attached thereon such that only one support post 35 need be accessible. However the invention will be described using two tray support arms which are attached at opposite ends to the underside of the tray support. Two of the caps 152 are removed so as to provide access to the inner hollow member 47 of two of the support posts 35. Again as shown in the Figures the support arms are attached to the smaller side of a rectangularly shaped utility cart 20. It will be readily apparent to those skilled in the art that the vertically adjustable support arms can be disposed within two support posts along a larger axis of the rectangular utility cart just as well. In this arrangement, an alternate cap 153 having a hole therein (FIG. 6) is placed over the openings 155 in the top shelf 29 and thus the support posts 35, the hole in the cap 153 being generally aligned with the inner hollow member 47 of the support post 35.

An operator would only need to hold one articulated arm in each hand, pressing down on the button 140, for example using a thumb on each button, thereby pushing the rod 110 and the lower second wedge 128 downward with respect to the tube 107 and the upper first wedge 125. The vertical member 83 of the vertical adjustment mechanism 105 is then placed within the inner hollow member of the support post, then inserted downward into the support post according to the desired height of the user. When that height is reached the button 140 is released, the spring 143 thereby urging the rod 110 upward within the tube 107 and the lower wedge 128 upward into contact with the washer 137 and the washer into contact with the first upper wedge 125. As the wedges are forced outward they frictionally engage the interior surface 80 of the inner hollow member 47 thereby locking the tray support arms 56 with respect to the support posts 35.

Due to the relatively tight tolerance between the adjustable support arms and the inner hollow members, misalignment of the support arms within the posts is minimized, if not eliminated all together. The support arms generally are required to be inserted within the inner hollow members of the support posts in substantial alignment due to the limited clearance available. The relatively soft material of the wedges, when contacted by the relatively hard material of the washer, forces the wedges outward into frictional contact with the inner surface of the inner hollow member. This frictional engagement is sufficient to prevent the support arms from sliding downward with respect to the support posts when equipment is placed on the top surface of the tray.

Figure 8:
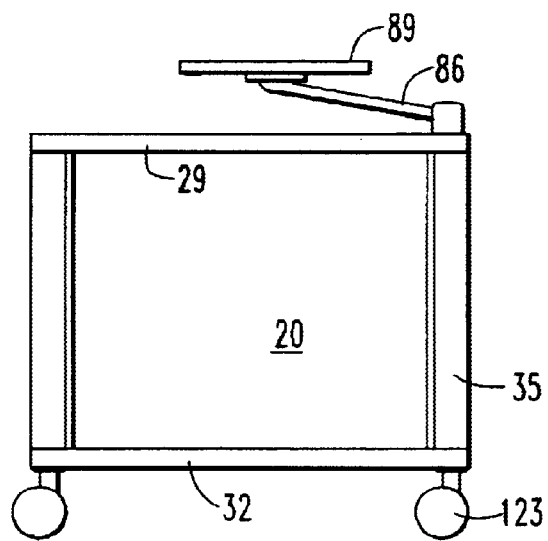
FIG. 8 is a side view of the tray support shown in FIG. 4 attached to the utility cart of the present invention.

FIG. 8 is a side view of the tray support shown in FIG. 4 attached to a utility cart. In this embodiment the horizontal section 92 between the first 95 and second 98 angular sections of the articulated arm 86 is relatively straight. Since the first angular section 95 is freely rotatably connected 96 to the outer tube 107 of the vertical member 83 of tray support arm 56 and the second angular section 98 is rotatably connected 101 to the underside of the support tray 89, the tray can be rotated in a 360° arc with respect to the tray support arm 56 and the articulated arm 86 can be rotated 360° with respect to the vertical member 83. Thus, the tray itself has two (2) degrees of 360° rotation with respect to the utility cart 20.

Figure 9:
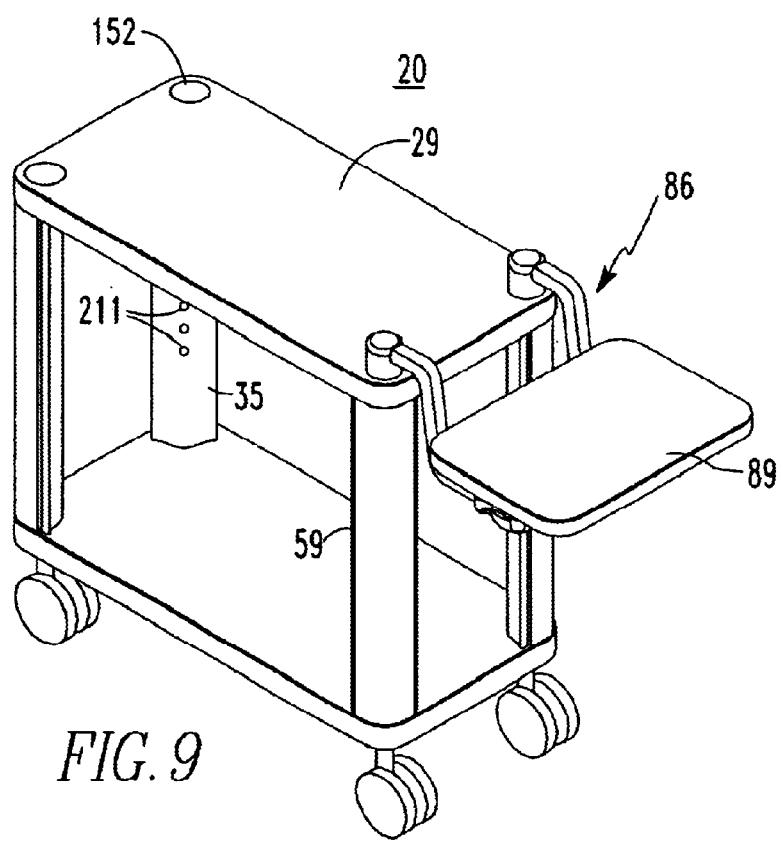
FIG. 9 is a side view of the tray support shown in FIG. 5 attached to the utility cart of the present invention.

As shown in FIG. 9 the articulated arm 86 in this embodiment includes a third angular section 104 between the first 95 and second 98 angular sections. This third angular section 104, drops below the height of the first angular section 95 connection 96 with the vertical member 83, thereby limiting the rotational capabilities of the tray 89 with respect to the articulated arm 86 as well as the rotation of the articulated arm 86 with respect to the utility cart 20. However for an ergonomic design it has been determined that this type of support arm is preferable when the utility cart is used for supporting a personal computer having a CPU unit which is mounted on the lower shelf. Depending on the size of the CPU, such as either in a flat or a tower configuration, the height of the cart is chosen accordingly.

Figure 10:
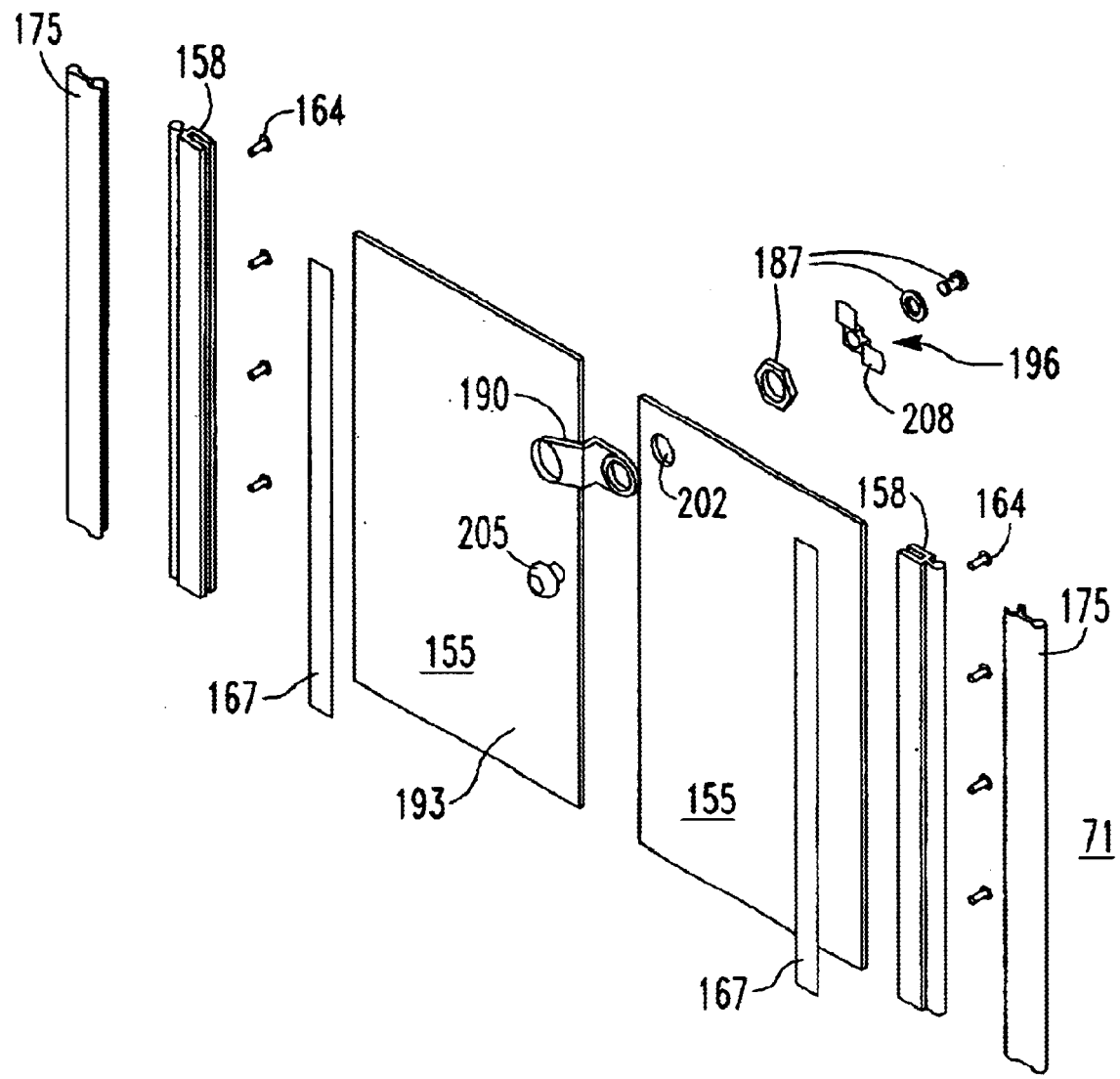
FIG. 10 is an exploded view of a door assembly for the utility cart of the present invention.

As shown in FIG. 10, an exploded view of a door assembly 38 for the utility cart 20 of the present invention is shown therein. The door assembly 38 comprises two door panels 155 and two hinge assemblies 71, which are substantially similar. A cross-section of the hinge assembly 71 is shown in detail in FIG. 3A with respect to its connection to the outer hollow member 44 of the support post 35. A first hinge mechanism 158 is secured to a door panel 155, such as by a 'U' shaped member 161 which captures the door panel 155 therein. Set screws 164 or another attachment means, may be used, in order to secure the door within the 'U' shaped member 161. A covering strip 167, such as decorative double sided tape, may be used to cover the exposed ends of the set screws 164. The opposite end of the first hinge mechanism 158 contains a circular portion 172 which is rotateably engaged with a second hinge mechanism 175. One end 178 of the second hinge mechanism 175 includes a generally 'C' shaped member for rotatably engaging the circular portion 172 of the first hinge mechanism 158, and the opposite end of the second hinge mechanism 175 contains a second circular portion 181 for engaging the circular opening 65 in the slot 59 of the outer hollow member 44 of the support post 35. This second circular portion 181 of the second hinge mechanism 175 is also rotateably mounted with respect to the support post 35. Thus two hinged or rotatable attachment mechanisms are provided for each door panel 155 so as to maximize the opening of the door assembly 38 with respect to the utility cart 20. Each door panel preferably includes such a hinge assembly 71.

As is conventional, each door panel 155 is secured to each other by a lock mechanism 187. A door pull 190 is provided on the accessible side 193 of the door panel 155 while a lock bar 196 is attached to the opposite side 199. Preferably one of the door panels 155 includes a hole 202 for securing the lock mechanism 187 thereto. The door pull 190 is attached to the lock bar 196 by a door lock 205 which is preferably operated by a key (not shown) in a conventional door lock arrangement. The lock bar 196 is generally 'L' shaped such that when the door pull 190 is rotated, the larger end 208 of the 'L' shaped lock bar does not engage the underside of the top shelf 29, whereas when rotated 90° it does so engage the edge of the top shelf 29. When the key lock is operated, the door pull 190 is prevented from rotating thereby locking the door assembly 38 with respect to the top shelf 29 and thus the utility cart 20.

As shown in the exploded view of the utility cart in FIG. 2, preferably an inside corner of the support post 35 has a plurality of holes 211 therein. Preferably these holes 211 are at the same position in each of the support posts 35. When considered with respect to FIG. 3, the holes 211 are disposed in the outer hollow member 44 in the area described by the slots 59 in the outer hollow member. These holes 211 are to accommodate support pegs (not shown) which are typically provided for adjustable shelving. A support peg is provided in corresponding holes 211 in each of the support posts 35 such that an intermediate shelf may be provided within the interior of the utility cart 20. This shelf is adjustable as is well known in the art by positioning the support pegs in any of the corresponding holes provided in the vertical length of the support posts 35. While eight (8) holes are shown in the exploded view in FIG. 2 more or less holes may be provided depending on the length of the support posts as well as the number of various positions for the shelf. Moreover more than one intermediate shelf may be provided between the top 29 and bottom 32 shelf utilizing the support peg and hole 211 arrangement.

As shown, a door assembly 38 is attached to the elongated side of a rectangularly shaped utility cart 20. The other side may also include a door assembly 38 or a single straight panel 41 which easily slides into corresponding slots 59 and is secured by respective rubber extrustion 74, which straight panels may also be provided for the other side of the cart 20. These panels 41 may also include slots (not shown) for wire management of electronic equipment and/or for ventilation for the equipment housed within the utility cart 20.

While specific embodiments of the invention have been described in detail, it would be appreciated by those skilled in the art that various modifications and alternations would be developed in light of the overall teachings of the disclosure. Accordingly, the particular arrangements disclosed are meant to be illustrative only and not limiting as to the scope of the invention, which is to be given the full breath of the appended claims and any and all equivalents thereof.

What is claimed is:

1. A cart assembly comprising a bottom shelf and a top shelf having a plurality of support posts secured therebetween, and a tray support assembly comprising:

a support arm having a first portion adapted to be engaged with an interior surface of one of said support posts;

an articulated arm having a first end connected to a second portion of the support arm opposite the first portion;

a support tray connected to a second end of the articulated arm opposite the first end; and wherein the support arm further comprises:
an outer tube;
a rod movable within the outer tube wherein opposed ends of the rod extend from the outer tube;
a first wedge secured to the outer tube at an engagement first portion thereof;
a second wedge secured to an engagement first end of the rod;
a washer slidably attached to the engagement first end of the rod between said first and second wedges; and
means for moving the rod within the tube such that the first and second wedges are placed in a first non-engaging position and a second engaging position whereby the support arm is in engagement within the interior surface of the at least one of said support posts.

2. The cart assembly as recited in claim 1, wherein said plurality of support posts comprise an extruded member.

3. The cart assembly as recited in claim 1, wherein each of said support posts is comprised of an outer hollow member and an inner hollow member including an interior surface and secured within said outer hollow member such that the first portion of said at least one support arm is adapted to engage the interior surface of the inner hollow member.

4. The cart assembly as recited in claim 3, wherein the outer hollow member includes means for attaching a panel cover thereto.

5. The cart assembly as recited in claim 4, wherein said attaching means comprises a slot such that a first slot of one of said support posts is in alignment with a second slot of another of said support posts whereby the panel cover engages said first and second slots whereby the panel cover is attached between said support posts.

6. The cart assembly as recited in claim 5, wherein the panel cover comprises a door assembly having a first hinge assembly engaged with the first slot and a second hinge assembly engaged with the second slot, each of said first and second hinge assemblies comprised of a first hinge mechanism attached to a door panel and second hinge mechanism rotateably attached to the first slot wherein the first hinge mechanism is rotateably attached to the second hinge mechanism.

7. A cart assembly comprising:

a bottom shelf and a top shelf having a plurality of support posts secured therebetween;

a tray support assembly comprising at least one support arm having a first portion adapted to be engaged with an interior surface of at least one of said support posts and an articulated arm having a first end connected to a second portion of the at least one support arm opposite the first portion;

a support tray connected to a second end of the articulated arm opposite the first end;

said support posts comprised of an outer hollow member having means for attaching a panel cover thereto and an inner hollow member including an interior surface and secured within said outer hollow member such that the first portion of said at least one support arm is adapted to engage the interior surface of the inner hollow member;

said attaching means comprising a slot such that a first slot of one of said support posts is in alignment with a second slot of another of said support posts whereby the panel cover engages said first and second slots whereby the panel cover is attached between said support posts; and the panel cover comprising a door assembly having a first hinge assembly engaged with the first slot and a second hinge assembly engaged with the second slot, each of said first and second hinge assemblies comprised of a first hinge mechanism attached to a door panel and a second hinge mechanism rotateably attached to the first slot wherein the first hinge mechanism is rotateably attached to the second hinge mechanism.

* * * * *